United States Patent [19]
Miertschin et al.

[11] 4,060,454
[45] Nov. 29, 1977

[54] NUCLEAR FUEL ELEMENT AND METHOD FOR MAKING SAME

[75] Inventors: Gary N. Miertschin, San Diego; Kenneth F. Powell, Cardiff, both of Calif.

[73] Assignee: General Atomic Company, San Diego, Calif.

[21] Appl. No.: 565,868

[22] Filed: Apr. 7, 1975

[51] Int. Cl.² .............................................. G21C 5/00
[52] U.S. Cl. ........................................ 176/84; 176/68
[58] Field of Search ................ 176/84, 85, 68; 264/.5

[56] References Cited

U.S. PATENT DOCUMENTS

| 3,186,913 | 6/1965 | Weisner et al. | 176/84 X |
|---|---|---|---|
| 3,390,889 | 7/1967 | Samos et al. | 264/.5 |
| 3,413,196 | 11/1968 | Fortescue et al. | 176/85 X |
| 3,781,190 | 12/1973 | Rapier | 176/84 X |
| 3,801,442 | 4/1974 | Walker et al. | 176/84 X |
| 3,804,711 | 4/1974 | Pettinger et al. | 176/84 |
| 3,891,502 | 6/1975 | Hackstein et al. | 176/84 X |

FOREIGN PATENT DOCUMENTS

| 838,450 | 6/1960 | United Kingdom | 176/84 |

Primary Examiner—Peter A. Nelson
Attorney, Agent, or Firm—Fitch, Even, Tabin & Luedeka

[57] ABSTRACT

A nuclear fuel element and a method for making the fuel element are described. The fuel element comprises a graphite block in which elongated holes are filled with nuclear fuel. The nuclear fuel in each of the holes comprises a plurality of fuel rod segments which are, before firing, spaced from each other by a plurality of spacers. Upon firing, the spacer material gasifies, leaving unfilled gaps between the fuel rod segments.

6 Claims, 3 Drawing Figures

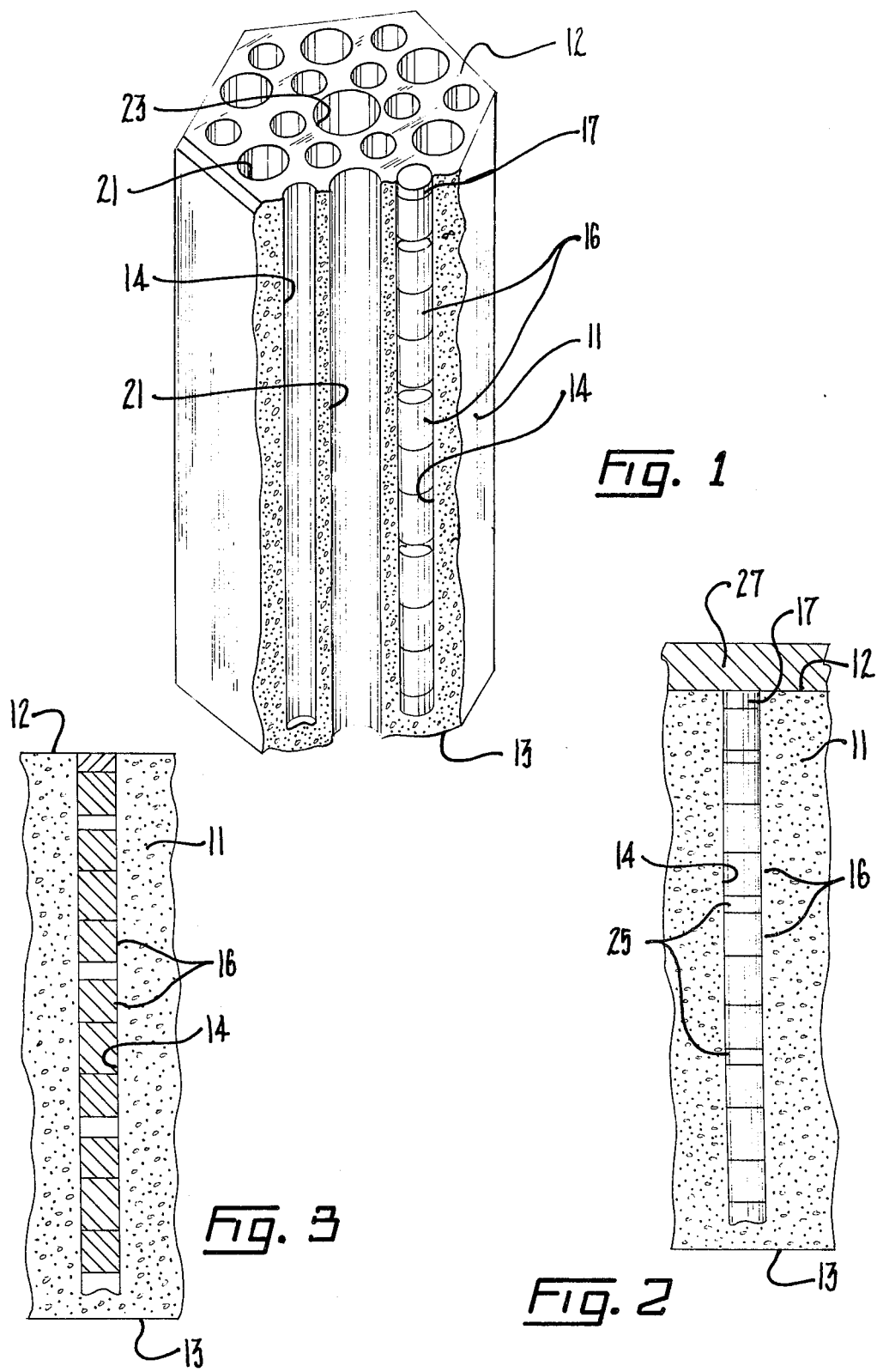

NUCLEAR FUEL ELEMENT AND METHOD FOR MAKING SAME

This invention relates generally to nuclear fuel elements of a type used in nuclear reactors. More particularly, the invention relates to a nuclear fuel element having improved characteristics, and to a method for making such a fuel element.

A form of nuclear reactor system which has met with success employs a reactive core comprised of a plurality of core blocks. The core blocks are stacked in columns and may be comprised of fissile or fertile material, neutron reflecting material, or combinations of some or all of these. A reactive core of this general type is shown and described in U.S. Pat. No. 3,359,175 assigned to the United States as represented by the Atomic Energy Commission.

A successful design for a nuclear fuel element in the above-mentioned form of reactor comprises a graphite block in which a plurality of elongated holes extend from one surface of the block to terminate from an opposite substantially parallel surface. The holes are filled with nuclear fuel in the form of fuel rods. The rods consist of nuclear fuel particles, i.e. fissile materials surrounded by a ceramic coating, embedded in a matrix of graphite filled pitch. A plurality of unfired or "green" fuel rods forming a fuel stack are inserted in each of the holes in the unfired graphite block and the block and fuel rods, in their assembled conditions, are fired at a suitable temperature, for example 1800° C. The holes are then plugged by wiping the inside of the upper portion of the holes with a primer, painting graphite glue around the bottom of the plugs, inserting the plugs to the proper depth into the fuel holes, and curing the glue of the plugged fuel element at a suitable temperature, for example 200° C.

The foregoing described fuel element design allows for shrinkage of the block due to irradiation by making the fuel stacks in each hole sufficiently short in length. The clearance between the fuel stack and the plug constitutes the design shrinkage in the fuel element block. Nevertheless, as the fuel element shrinks during the course of its life, the fuel rods frequently contact the walls of the holes with sufficient friction to cause the build-up of high tensile stresses in the rod and the graphite block due to relative differences in shrinkage rates of the fuel rods and the fuel element graphite under irradiation.

Another problem present in the foregoing design is that, during firing, the fuel rods tend to expand. Thus, to achieve a fired rod length equal to the green rod length, a retaining device is placed at the top of each rod during firing and is removed after firing for the purpose of allowing the fuel element to be cleaned. Such restraining devices are relatively expensive, are difficult to mount, and may tend to stick when an attempt is made to remove it after firing due to bleeding of the matrix graphite filled pitch out of the fuel rod.

A further problem occurring in connection with the foregoing design is that the insertion and glueing of the plugs is difficult to accomplish, particularly by fully automated means.

It is an object of the present invention to provide an improved nuclear fuel element.

Another object of the invention is to provide a nuclear fuel element of the type which utilizes fuel rods in a graphite block wherein the build-up of tensile stresses during the life of the fuel element is minimized.

Another object of the invention is to provide a nuclear fuel element in which nuclear fuel is contained in plugged holes in a graphite block and wherein the holes are readily plugged and glued by automated means.

Another object of the invention is to provide a nuclear fuel element employing a graphite block with nuclear fuel rods therein in which the length of the rod is easily maintained during firing.

Other objects of the invention will become apparent to those skilled in the art from the following description, taken in connection with the accompanying drawings wherein:

FIG. 1 is a perspective view, partially in section, of a nuclear fuel element constructed in accordance with the invention;

FIG. 2 is a full section view of a portion of a nuclear fuel element of the invention illustrating a step in the method of its manufacture; and FIG. 3 is a full section view of a portion of a nuclear fuel element similar to that of FIG. 2 illustrating completion of the method of manufacturing.

The fuel element of the invention includes a block 11 comprised substantially of graphite and having substantially parallel opposite surfaces 12 and 13 thereon. The fuel block has a plurality of elongated holes 14 therein extending from the surface 12 and terminating spaced from the other surface 13 so that they are open only at one end. Each of the holes contains a plurality of fuel segments 16 at least some of which are spaced from each other axially along the hole. The total of the distances the segments are spaced accommodates shrinkage of the block due to irradiation. A plug 17 closes each of the holes at the surface 12.

More particularly, the fuel block 11 is comprised substantially of graphite and, in the illustrated embodiment, is of hexagonal cross section. The surfaces 12 and 13 are planar surfaces and extend perpendicular to the six hexagonal flats of the block. The holes 14 extend perpendicularly of the surfaces 12 and 13, parallel with the hexagonal flats, and, as previously mentioned, terminate a distance spaced from the surface 13 so that holes are open only at one end, that is, the end of the surface 12. For purposes of clarity, one of the two fuel holes illustrated in FIG. 1 is shown empty.

In addition to the fuel holes 14, the graphite block 11 contains a plurality of coolant flow passages 21 which extend entirely through the block from the surface 12 to the surface 13. The passages 21 align with corresponding passages in the blocks immediately above and below the illustrated block in the reactor core to provide a passage for the flow of coolant through the reactor core for removing heat therefrom. Dowels, keyways, or other means, not shown, may be provided for locking the adjacent blocks together to provide rigidity for the core against vibration and seismic disturbances. The core block 11 also contains a central passage 23 which extends partly through the block from the surface 12 and which is used for the purpose of accommodating a fuel handling tool, not shown, for moving the block 11. Other holes, not illustrated, may be provided in the block 11 for the purpose of accommodating control rods or reserve shutdown poison for controlling the reactivity of the reactor core.

In manufacturing the nuclear fuel element of the invention, each of the fuel holes 14 is filled with a plurality of fuel rod segments 16. Some of the fuel rod segments 16 are spaced axially along the hole 14, as may be seen in FIG. 2, by spacers 25. The fuel rod segments 16 comprise nuclear fuel particles having a core of fissile and/or fertile material surrounded by a ceramic shell. These particles are embedded in a matrix which comprises a mixture of graphite flour and a suitable binding pitch, as is known in the art.

The spacers 25 are placed in the hole 14 between some of the fuel rod segments 16. The spacers are of an axial length the total of which is sufficient to accommodate the difference in shrinkage between the fuel element block and the fuel rod segments due to irradiation over the expected life of the fuel element. The material of which the spacers 25 are comprised is a high softening point (i.e. greater than 300° F), low coking yield (i.e. less than 5%), plastic which will gasify and therefore disappear at the firing temperature of the fuel element. Examples of plastics of this nature are polytetrafluorethane, polyacetal, polystyrene, polycarbonate, epoxies and silicones. It should be noted that the spacers need not be positioned between every one of the fuel segments in the stack, but may be positioned in a distributed manner to achieve maximum benefits from the spacing in terms of reactivity and heat distribution in the operating core.

The plug 17 is then inserted in the hole at the top of the stack of spacers and fuel rod segments. A radial gap is allowed between the plug and the inner wall of the fuel hole which is of sufficient magnitude so as to allow seepage of matrix from the uppermost fuel rod segment into the space during firing. A gap of 0.002 to 0.004 inch is satisfactory in many cases for this purpose. The top of the plug 17 is flush with the upper surface 12 of the fuel element block 11 and the total height of the column of fuel rod segments, spacers 25, and plug 17 is equal to the depth of the hole 14, within allowable tolerances. In the illustrated embodiment, the plug 17 is a right circular cylinder. Alternative constructions may include a knurled outer surface on the plug, an annular recess on the outer surface of the plug, or circumferential or axial ribs on the outer surface of the plug to enhance the gripping effect of the fuel rod matrix. The plug, however, is preferably symmetrical for ease of automated handling and insertion in the fuel element block.

After the fuel holes 14 have all been filled as above described, a top plate 27 is placed against the upper surface 12 of the fuel block flush therewith. Suitable bolts, not shown, may be placed through the plate to secure same to the fuel element block, such as by mating threads providing at the top of the coolant passages 21.

The entire assembly is then heated or fired, at 1800° C for example, cooled, and the top plate removed and the element cleaned. The plate 27 serves to restrain the fuel stack from expanding during firing in order to achieve a fired stack height equal to the green stack height. The resultant assembly is seen in FIG. 3. In FIG. 3, it may be seen that the plastic spacers 25 have disappeared, leaving open or unoccupied spaces between certain of the fuel rod segments.

The fuel element and method of the invention permit the use of a simple and inexpensive restraining plate 27 that may be easily attached to and removed from the top of the fuel element. Because the plug 17 is symmetrical and is glued in automatically by the bleeding of the matrix from the fuel rod segment immediately adjacent thereto, the plugging operation is simplified considerably. The use of unoccupied spaces in the fuel rods, through the utilization of fuel rod segments and spacers, more readily distributes the fuel along the length of the fuel holes. This minimizes the accumulation of tensile stresses as a result of differential shrinkage due to irradiation. Moreover, the more homogeneous distribution of fuel throughout the fuel element avoids undesirable concentrations of fuel temperatures during reactor operation.

By allowing for matrix bleeding and suitable clearances between the fuel rod segments and the walls of the fuel holes, sufficient friction may be achieved to hold the fuel rod segments in place, but to allow them to slide and thus accommodate differential shrinkage. Because of the distribution of the fuel rod segments through the holes, the necessity of using a matrix material which shrinks away from the block to avoid bonding is lessened. This enables the use of matrix materials which typically have a lower coke yield and in addition which have less tendency to interact with the fuel particles themselves.

It may be seen that the invention provides an improved nuclear fuel element and an improved method for making same. The fuel element readily accommodates differential shrinkage due to irradiation, is easy to fabricate, and provides a homogeneous distribution of fuel throughout the element.

Various modifications of the invention in addition to those shown and described herein will become apparent to those skilled in the art from the foregoing description and accompanying drawings. Such modifications are intended to fall within the scope of the appended claims.

What is claimed is:

1. A nuclear fuel element comprising, a block comprised substantially of graphite and having opposite surfaces thereon, said block having a plurality of longitudinal passages therethrough for flowing coolant, said block having a plurality of elongated fuel holes therein separate from said longitudinal passages substantially parallel therewith extending from one of said opposite surfaces and terminating spaced from the other of said opposite surfaces, a plurality of substantially cylindrical fuel rod segments in each of said holes engaging the sides thereof with sufficient friction to hold said fuel rod segments in place axially in said holes but allowing said fuel rod segments to slide with respect to said block in response to differential shrinkage therebetween, said fuel rod segments being spaced axially along said holes, at least some of said segments being spaced from each other axially distances forming void spaces the total of which compensates for shrinkage of said block due to irradiation, and a plug closing each of said holes at said one of said opposite surfaces.

2. A nuclear fuel element according to claim 1 wherein said fuel rod segments are comprised of fuel particles embedded in a matrix material, one of said fuel rod segments in each of said holes being positioned immediately adjacent said plug therein, each of said plugs being secured in its respective hole by said matrix material.

3. A nuclear fuel element according to claim 2 wherein said plugs are recessed in said holes flush with said one of said opposite surfaces.

4. A nuclear fuel element according to claim 1 wherein said fuel block is of hexagonal cross section and wherein said opposite surfaces are parallel with each other and perpendicular with said hexagonal sides, said block having at least one further longitudinal passage therein for accommodating a control rod.

5. A nuclear fuel element according to claim 1 wherein each of said plugs is symmetrical.

6. A nuclear fuel element according to claim 1 wherein said elongated holes are parallel with each other and substantially perpendicular to said opposite surfaces.

* * * * *